United States Patent [19]

Austin et al.

[11] 4,228,216

[45] Oct. 14, 1980

[54] PRODUCTION OF RADIATION CURABLE MICROCAPSULAR COATING COMPOSITIONS, PRESSURE-SENSITIVE TRANSFER PAPER AND ITS PRODUCTION

[75] Inventors: Robert A. Austin; Dale R. Shackle, both of Chillicothe, Ohio

[73] Assignee: The Mead Corporation, Dayton, Ohio

[21] Appl. No.: 912,376

[22] Filed: Jun. 5, 1978

Related U.S. Application Data

[63] Continuation-in-part of Ser. No. 811,556, Jun. 30, 1977, abandoned.

[51] Int. Cl.[3] .......................... B32B 3/26; B05D 3/06; B41M 3/12; C09D 11/00

[52] U.S. Cl. .......................... 428/307; 106/21; 252/316; 282/27.5; 427/54.1; 427/55; 427/150; 427/151; 428/327; 428/914

[58] Field of Search .......................... 252/316; 282/27.5; 427/53, 54, 150, 151, 152; 428/307, 327, 914; 96/115 P; 106/21

[56] References Cited

U.S. PATENT DOCUMENTS

| | | | |
|---|---|---|---|
| 2,800,458 | 7/1957 | Green | 252/316 |
| 3,130,050 | 4/1964 | Schwerin | 96/115 P X |
| 3,405,071 | 10/1968 | Reyes | 252/316 |
| 3,432,327 | 3/1969 | Kan et al. | 252/316 X |
| 3,720,623 | 3/1973 | Cartmell et al. | 252/316 |
| 4,021,364 | 5/1977 | Speiser et al. | 252/316 |
| 4,091,122 | 5/1978 | Davis et al. | 427/152 X |
| 4,110,511 | 8/1978 | Lee et al. | 428/307 |

*Primary Examiner*—Richard D. Lovering
*Attorney, Agent, or Firm*—Stephen H. Cagle; Charles N. Shane, Jr.; Wilson G. Palmer

[57] ABSTRACT

The invention relates to a process for producing a radiation curable coating composition containing microcapsules having a hydrophobic liquid core as follows: An emulsion containing droplets of hydrophobic emulsion component dispersed in a hydrophilic liquid component is prepared. The hydrophobic emulsion component comprises a hydrophobic liquid and a first wall-forming material soluble therein and capable of reacting by condensation polymerization with a second wall-forming material to form a polymeric capsule wall which is substantially insoluble in, and impermeable to, the hydrophilic and hydrophobic emulsion components. The hydrophilic emulsion component comprises an emulsifier and a radiation curable hydrophilic liquid which comprises water and at least one radiation curable polar compound. The emulsion also contains the second wall-forming material. The emulsion is subjected, with stirring, to temperature conditions for a period of time sufficient to react the first and second wall-forming materials to form a dispersion of microcapsules in the hydrophilic emulsion component. The radiation curable dispersion containing a photoinitiator can be coated on a paper substrate and set by subjection to a combination of ultraviolet and infrared radiation for a period of time sufficient to polymerize the radiation curable hydrophilic liquid to a tack-free resinous film on the paper substrate.

13 Claims, No Drawings

PRODUCTION OF RADIATION CURABLE MICROCAPSULAR COATING COMPOSITIONS, PRESSURE-SENSITIVE TRANSFER PAPER AND ITS PRODUCTION

CROSS REFERENCE TO RELATED APPLICATION

This application is a continuation-in-part of commonly assigned, copending application U.S. Ser. No. 811,556, filed June 30, 1977 and now abandoned.

BACKGROUND OF THE INVENTION

1. Field of the Invention:

This invention relates to the production of radiation curable microcapsular coating compositions. In particular, it relates to the production of microcapsules containing a hydrophobic liquid core by polycondensation polymerization of two wall-forming materials in a hydrophilic liquid continuous phase wherein the hydrophilic liquid comprises a polar radiation curable compound. In one embodiment of this invention, the encapsulated hydrophobic liquid contains a chromogenic material soluble in the encapsulated hydrophobic liquid. A dispersion of these microcapsules containing a chromogenic material can be coated on a substrate and cured by radiation to give a pressure-sensitive carbonless copy sheet having a transfer coating.

2. Prior Art:

The production of microcapsules containing an encapsulated oily (hydrophobic) liquid wherein the microcapsule walls are produced by a polycondensation reaction of polyisocyanate and a second wall-forming material is described in U.S. Pat. No. 3,796,669 to Kiritani et al. Both the polyisocyanate wall-forming material and the second wall-forming material are mixed with oily liquid. The mixed oily liquid is dispersed into an aqueous continuous phase and the temperature is raised to initiate the reaction on the surface of the oil drops to encapsulate the oil drops with the reaction product of the polyisocyanate and second wall-forming material. A catalyst for the reaction may also be added to the oily liquid.

A number of patents disclose the production of microcapsules using interfacial condensation polymerization of two or more reactants to form the microcapsule walls. Typical of these are:

U.S. Pat. No. 3,429,827 (1969) to Ruus
U.S. Pat. No. 3,432,427 (1969) to Kan et al
U.S. Pat. No. 3,464,926 (1969) to Vandegaer et al
U.S. Pat. No. 3,492,380 (1970) to Santo et al
U.S. Pat. No. 3,575,882 (1971) to Vandegaer et al
U.S. Pat. No. 3,577,515 (1971) to Vandegaer.
U.S. Pat. No. 3,607,776 (1971) to Santo et al
U.S. Pat. No. 3,726,804 (1973) to Matsukawa et al
U.S. Pat. No. 3,875,074 (1975) to Vassiliades et al It is important to note that none of the above listed patents or U.S. Pat. No. 3,796,669 to Kiritani disclose the in situ preparation of the microcapsules in a radiation curable hydrophilic liquid containing a radiation curable polar compound.

Carbonless copy paper, briefly stated is a standard type of paper wherein during manufacture the backside of the paper substrate is coated with what is referred to as a CB or transfer coating, the CB coating containing one or more chromogenic materials, generally in capsular form. At the same time the front side of the paper substrate is coated during manufacture with what is referred to as a CF coating, which contains one or more chromogenic materials capable of producing a color with encapsulated CB chromogenic material. Both the chromogenic materials remain in the coatings on the respective back and front surfaces of the paper in substantially colorless form. This is true until the CB and CF coatings are brought into overlying relationship and sufficient pressure, as by a typewriter, is applied to rupture the CB coating to release the encapsulated chromogenic material. At this time the chromogenic material contacts the CF coating and reacts with the chromogenic material therein to form a colored image. Carbonless copy paper has proved to be exceptionally valuable image transfer media for a variety of reasons, only one of which is the fact that until a CB coating is placed next to a CF coating both the CB and CF coatings are in an inactive state as the coreactive elements are not in contact with one another until pressure is applied. Patents relating to carbonless copy paper products are:

U.S. Pat. No. 2,712,507 (1955) to Green
U.S. Pat. No. 2,730,456 (1956) to Green et al.
U.S. Pat. No. 3,455,721 (1969) to Phillips et al.
U.S. Pat. No. 3,466,184 (1969) to Bowler et al.
U.S. Pat. No. 3,672,935 (1972) to Miller et al.
U.S. Pat. No. 3,720,623 (1973) to Cartmell et al.

A disadvantage of coated paper products such as carbonless transfer papers stems from the necessity of applying a liquid coating composition containing the color forming ingredients during the manufacture process. In the application of such coatings, volatile organic solvents are sometimes used which then in turn requires evaporation of excess solvent to dry the coating thus producing volatile solvent vapors. An alternate method of coating involves the application of the color forming ingredients in an aqueous slurry requiring removal of water by drying. Both methods suffer from serious disadvantages. In particular, the organic solvent coating method necessarily involves the production of generally volatile solvent vapors, creating both a health and fire hazard in the surrounding environment. When using an aqueous solvent system the large amounts of water must be evaporated since the microcapsule coatings currently used commercially generally comprise 60% to 85% water. This involves the expenditure of significant amounts of energy and further necessitates a separate drying step which requires the use of complex and expensive apparatus to continuously dry a substrate which has been coated with such aqueous coating compositions.

Radiation curable coating compositions and methods of producing these compositions are well known, although their use is not well known in the production of carbonless papers. In general, patents concerned with the production and application of liquid resin compositions containing no volatile solvent which are subsequently polymerized by free radical radiation to a solid film are:

U.S. Pat. No. 3,551,235 (1970) to Bassemir et al.
U.S. Pat. No. 3,551,246 (1970) to Bassemir et al.
U.S. Pat. No. 3,551,311 (1970) to Nass et al.
U.S. Pat. No. 3,558,387 (1971) to Bassemir et al.
U.S. Pat. No. 3,661,614 (1972) to Bassemir et al.
U.S. Pat. No. 3,720,534 (1973) to Macaulay et al.
U.S. Pat. No. 3,754,966 (1973) to Newman et al.
U.S. Pat. No. 3,772,062 (1973) to Shur et al.
U.S. Pat. No. 3,772,171 (1973) to Savageau et al.

U.S. Pat. No. 3,801,329 (1974) to Sandner et al.
U.S. Pat. No. 3,819,496 (1974) to Roskott et al.
U.S. Pat. No. 3,847,768 (1974) to Kagiya et al.
U.S. Pat. No. 3,847,769 (1974) to Garratt et al.

These compositions generally also contain a pigment or dye. Such resin compositions are useful for protective coatings and fast drying inks. U.S. Pat. No. 3,754,966 describes the production of an ink releasing dry transfer element which can be used as a carbon paper or typewriter ribbon. Additionally it is known to use such radiation in the formation and hardening of microcapsules although none of these microcapsules are known to have utility in the carbonless paper environment. Patents known to use radiation in the preparation of microcapsules are:

U.S. Pat. No. 3,242,051 (1966) to Hiestand et al.
U.S. Pat. No. 3,265,630 (1966) to Jensen
U.S. Pat. No. 3,405,071 (1968) to Reyes
U.S. Pat. No. 4,021,364 (1977) to Speiser et al.

It is significant to note that the encapsulated materials disclosed in any of the above patents do not include oil solutions of colorless dyes. It is particularly significant in view of the fact that the radiation cured coating of the instant invention must be compatible with the reaction of CB and CF chromogenic materials to form a color in order to have utility in the carbonless paper environment. Such color forming reactions are generally of a sensitive or delicate nature and are not generally compatible with the compositions found in the prior art. For instance, it is known that certain color precursors currently used in the commercial production of carbonless transfer sheets will undergo a color change when exposed to ultraviolet radiation.

The novel liquid coating compositions of this invention are dispersions of microcapsules having a hydrophobic core liquid in a radiation curable hydrophilic liquid. The hydrophilic liquid contains water which constitutes about 20% to about 60% by weight of the coating composition. The novel coating compositions are prepared by a novel process in which the microcapsules are formed in situ in the radiation curable hydrophilic liquid. The radiation curable hydrophilic liquid cures by exposure to give a tack-free film containing microcapsules thus omitting an additional drying step necessary for the prior art solvent or aqueous based microcapsular coating compositions. The cured continuous phase acts as a binder to adhere the microcapsules to a substrate. In a preferred embodiment, the microcapsules can contain a chromogenic material in the hydrophobic core liquid. Coating compositions containing such microcapsules may be used in the preparation of pressure-sensitive transfer papers.

The microcapsular coating compositions of the instant invention have a significantly lower water content than the microcapsular coating compositions currently used in the preparation of carbonless transfer papers. For example, prior art coating compositions containing gelatin are seldom applied at a water content below 80% (20% solids). In comparison with a microcapsular coating composition containing 40% water (60% solids) produced by the process of this invention, the amount of water necessary to be evaporated from the prior art compositions is 6 times the amount to be evaporated from the coating compositions of this invention. By using the coating compositions of this invention, a substantial reduction in heat energy used in drying can be realized. Another advantage is that by using available sources of ultraviolet radiation which also contains infra-red radiation such as the radiation from a mercury vapor lamp the microcapsular coating may be cured in one combined in one combined polymerization and drying step, thus eliminating the need for additional or separate drying.

STATEMENT OF THE INVENTION

This invention relates to a process for producing a radiation curable coating composition containing microcapsules having a hydrophobic liquid core comprising the following steps: An emulsion containing droplets of a hydrophobic emulsion component dispersed in a hydrophilic emulsion component is prepared. The hydrophobic emulsion component comprises a hydrophobic liquid. The hydrophobic emulsion component additionally contains a first-wall forming material capable of reacting by condensation polymerization with a second wall-forming material to form a polymeric capsule wall. The first wall-forming material is soluble in the hydrophobic emulsion component. The polymeric capsule wall is substantially insoluble in the hydrophilic and the hydrophobic emulsion components. The hydrophilic emulsion component comprises an emulsifier dispersed in a radiation curable hydrophilic liquid. The radiation curable hydrophilic liquid comprises water and at least one radiation curable polar compound. The emulsion additionally contains the second wall-forming material. The emulsion is subjected, with stirring, to temperature conditions for a period of time sufficient to react the first and second wall-forming materials to form a dispersion of microcapsules in the hydrophilic emulsion component. The microcapsules have capsule walls substantially impermeable to the hydrophilic and the hydrophobic emulsion components. The radiation curable dispersion so produced can be coated on a paper substrate and set by subjecting the dispersion on the paper substrate for a period of time sufficient to cure the radiation curable hydrophilic liquid to a tack-free resinous film on the paper substrate. The radiation is a combination of ultraviolet and infra-red radiation. The invention further relates to a radiation curable coating composition containing microcapsules. The microcapsules have a hydrophobic liquid core and are dispersed in a radiation curable hydrophilic liquid. The radiation curable hydrophilic liquid comprises a polar radiation curable compound and water. The radiation curable coating composition additionally contains a photoinitiator.

DETAILED DESCRIPTION OF THE INVENTION

The coating compositions produced by the process of this invention are essentially dispersions of microcapsules containing a hydrophobic liquid core material in a radiation curable hydrophilic liquid as a continuous phase. The dispersions of microcapsules are prepared in situ in the radiation curable hydrophilic liquid by a condensation polymerization reaction of a first wall-forming material and a second wall-forming material. The coating compositions can be applied as a coating to a substrate such as paper or plastic film and can be cured by radiation to a tack-free resinous film. If the microcapsules contain a chromogenic material, the coated paper is useful as a pressure-sensitive carbonless transfer CB paper. For purposes of this invention, the term "chromogenic" shall be understood to refer to materials such as color precursors, color developers, and color formers.

The coating composition can contain additional materials which function as photoinitiators. Addition of these materials depends upon the particular method of curing the microcapsular coating. Filler materials can also be added to modify the properties of the cured film. Although the product and process of this invention are useful in the manufacture of a variety of microencapsulated products, such as, for example, microencapsulated flavors, foods, pharmaceuticals, insecticides and the like, the preferred use of the process and product of this invention is in the production of a pressure-sensitive carbonless transfer sheets such as is described in commonly-assigned, co-pending U.S. Application Ser. No. 684,462, filed May 7, 1976 and now U.S. Pat. No. 4,091,122.

The hydrophobic liquids useful in the process of this invention are the non-polar oils and solvents. In the preferred use of this invention, i.e. to prepare pressure-sensitive carbonless transfer sheets, the preferred hydrophobic liquids are monoisopropybiphenyl (MIPB), chlorinated paraffins, alkylnaphalenes, kerosene, petroleum naphtha and mixtures thereof.

The chromogenic materials useful in the practice of this invention are the electron-donor type color precursors. These include the lactone phthalides, such as crystal violet lactone, and 3,3-bis-(1'-ethyl-2-methylindol-3'-yl) phthalide, the lactone fluorans, such as 2-dibenxylamino-6-diethylamino-fluoran and 5-diethylamino-1,3-dimethylfluoran, the lactone xanthenes, the leucoauramines, the 2-(omega substituted vinylene)-3,3-disubstituted-3-H indoles and 1,3,3-trialkylindolinospirans. Mixtures of these color precursors can be used if desired. The color precursors are soluble in the hydrophobic liquid and are preferably present in such solutions, sometimes referred to as carrier oil solutions, in an amount of from about 0.5% to about 20.0% based on the weight of the oil solution, and the most preferred range is from about 2% to about 7%.

The radiation curable hydrophilic liquids useful in the practice of this invention comprise the free radical polymerizable ethylenically unsaturated organic compounds in water solution. These compounds contain at least one terminal ethylenically unsaturated group per molecule. These compounds are radiation curable polar compounds and their aqueous solutions function in part as the continuous hydrophilic phase during the in situ preparation of the microcapsules and as a dispersing medium for the microcapsules and other ingredients of the coating composition prior to the coating operation. They are curable to a solid resin when exposed in the presence of a photoinitiator to ultraviolet radiation containing additionally some infra-red radiation. The cured resin acts as a binder for the microcapsules to a substrate such as paper.

Examples of useful radiation curable polar compounds are N-vinyl-2-pyrrolidone, acrylamide, hydroxyethyl acrylate, hydroxypropyl acrylate, diacetone acrylamide, 2-acrylamido-2-methylpropanesulfonic acid, acrylic acid, polyethylene glycol monoacrylates, polyethylene glycol polyacrylates, polyvinyl alcohol acrylate, starch acrylate, cellulose acrylate, quaternary ammonium salt derivatives of dimethylaminoethyl acrylate and methacrylate and mixtures thereof. The above radiation curable polar compounds are liquids. However, solid radiation curable polar compounds, such a N-methylol acrylamide, can be dissolved in water and used as the radiation curable hydrophilic liquid. The preferred polar compounds are N-methylol acrylamide and hydroxyethyl acrylate.

The first wall-forming material is soluble in and forms a part of a hydrophobic emulsion component. It may be either a polyisocyanate or a polyacid halide compound. The polyisocyanates useful in this invention are the aliphatic and aromatic polyisocyanates which include, for example, (a) diisocyanates, such as m-phenylmethane-4,4'-diisocyanate; (b) triisocyanates, such as toluene-2,4,6-triisocyanate; (c) tetraisocyanates, such as 2, 2,5,5-tetraisocyanate; (d) isocyanate prepolymers produced and sold by Mobay Chemical Company, Pittsburg, Pennsylvania), Mondur CB-75 (75% of a high molecular weight adduct of toluene isocyanate and 25% of ethyl acetate produced and sold by Mobay Chemical Company) Desmodur N-100 (a biuret containing aliphatic isocyanate also produced and sold by Mobay Chemical Company and NIAX SF-50 (a trifunctional aromatic polyurethane prepolymer having a free isocyanate content of 32.5% made and sold by Union Carbide Corporation, New York, N.Y.). Mixtures of these compounds may be used.

The polyacid halides include terephthalyl dichloride, adipyl dichloride, 1,3,5-benzenetricarboxylic acid trichloride, oxalyl dibromide, 1,4benzenedisulfonyl dichloride and 4,4'-biphenyldisulfonyl dichloride. Mixtures of these compounds may also be used. The preferred first wall-forming materials are NIAX SF-50, Desmodur N-100 and terephthalyl dichloride.

The second wall-forming material can be selected from the group consisting of polyols, polythiols, polyamines, acid anhydrides, and polycarboxylic acids and mixtures thereof. The polyols include for example, glycerin, resorcinol, 1,3-naphthalenediol, bisphenol A,1,3-propylene glycol, 1,5-pentanediol and the like. Examples of polythiols are thioglycol and thioglycol condensates. Polyamines include, for example, p-phenylenediamine, diethylene triamine, N,N,N',N'-tetrakis-(2-hydroxypropyl) ethylene diamine (Quadrol-Wyandotte Chemical Corp., Wyandotte, Michigan) and phthalamide and the like. Examples of acid anhydrides include maleic anhydride and succinic anhydride. Examples of polycarboxylic acids are malonic acid, succinic acid and terephthalic acid. The preferred second wall-forming materials are Quadrol and diethylene triamine.

A photoinitiator is added to the coating composition to permit curing by ultraviolet radiation. A wide variety of photoinitiators are available which serve well in the system described in this invention. The preferred photoinitiators are the benzoin alkyl ethers, such as Vicure 30, benzoin methyl ether, α, α azobisisobutyronitrile, α,α-diethoxyacetophene and zinc carbonate. Other photoinitiators which can be used are benzophenone, 4,4'-bis(dimethylamino)benzophenone, ferrocene, xanthone, thioxanthane, decabromodiphenyl oxide, pentabromomonochlorocyclohexane, pentachlorobenzene, benzoin ethyl ether, 2-ethyl anthraquinone, 1-(chloroethyl)-naphthalene, desyl chloride, chlorendic anhydride, naphthalene sulfonyl chloride and 2-bromoethyl ethyl ether. The amount of photoinitiator added can be from about 0.2% to about 10% by weight of the coating composition, with a preferred range from about 1% to about 4% by weight.

Photoinitiation synergists can be added, if desired, to the ultraviolet curable coating compositions. Photoinitiation synergists serve to enhance the initiation efficiency of the photoinitiators. The preferred synergists are the chain transfer agents, such as the tertiary alcoholamines and substituted morpholines, triethanolamine, N-methyldiethanolamine, N,N-dimethylethanolamine and N-methylmorpholine. The amount of photoinitiation synergist added can be from about 0.2% to about 10% by weight of the coating composition with a preferred range of from about 3% to about 4% by weight.

In the preparation of the dispersion of microcapsules of this invention, a hydrophobic emulsion component is prepared by dissolving the first wall-forming material in an hydrophobic liquid, as for example, an oil. If the microcapsules are to be used in preparing carbonless copy papers, a chromogenic material is dissolved in a carrier oil.

The hydrophilic emulsion component is prepared by dissolving or dispersing an emulsifier and at least one radiation curable polar compound in water. Any of the known emulsifiers can be used including polyvinyl alcohol, carboxymethyl cellulose, hydroxypropyl cellulose and Triton N-101 (Rohm and Haas, Phildephia, Pa.). The water from the radiation curable hydrophilic liquid increases the polarity of the hydrophilic emulsion component to a point where the two phases, hydrophobic and hydrophilic, are essentially insoluble in each other, thus permitting formation of an emulsion. At this point, the second wall-forming material soluble in the hydrophilic emulsion component can also be dissolved in the hydrophilic emulsion component. Alternatively, the second wall-forming material can be added to the emulsion formed during the emulsification step. To facilitate mixing the second wall-forming material may be dissolved in additional radiation curable hydrophilic liquid prior to addition to the emulsion.

Alternatively, the second wall-forming material may be added to the hydrophobic emulsion component. In this case, the second wall-forming material is soluble in the hydrophobic emulsion component. Some second wall-forming materials, for example, diethylene triamine, are soluble in both the hydrophobic and hydrophilic emulsion components. These materials can be added to the hydrophobic and/or hydrophilic emulsion components or to the emulsion formed by the emulsification step.

Preparation of each of these components is easily accomplished by stirring together at room temperature the materials of each component. The Brookfield viscosity of the hydrophilic emulsion component can be from about 0.5 cps. to about 1,000 cps. The preferred viscosity is about 1 cps. to about 500 cps. and the most preferred viscosity is from about 1 cps. to about 50 cps.

The hydrophobic and hydrophilic emulsion components prepared as above are mixed together with high agitation to form an emulsion containing droplets of the hydrophobic emulsion component dispersed in the continuous hydrophilic emulsion component.

The term "soluble" as used herein is intended to describe wall-forming materials which are only partially soluble in and give hazy solutions in the radiation curable hydrophilic liquid as well as those which are completely soluble in the radiation curable hydrophilic liquid.

After emulsification, the emulsion is stirred for a period of about 3 hours to about 16 hours at a temperature of about 0° C. to about 70° C., preferably room temperature to about 40° C., to allow the first and second wall-forming materials to react and form a dispersion of microcapsules having capsule walls which are substantially impermeable to both the hydrophilic and hydrophobic emulsion components used to form the microcapsules. The microcapsules should be from about 0.1 micron to about 50 microns in diameter. A preferred range is from about 5 to 15 microns.

After formation of the microcapsules is complete, the photoionitiator is added. The microcapsular coating compositions prepared according to this invention can contain from about 20% to about 60%, by weight, water. The preferred range is from about 30% to about 50% water. The coating composition of this invention can be applied to a substrate, such as paper or a plastic film by any of the common paper coating processes such as roll, air knife, or blade coating, or by any of the common printing processes, such as offset, gravure, or flexographic printing. The rheological properties, particularly, the viscosity of the coating compositions, can be adjusted for each type of application by proper selection of the type, molecular weight and relative amounts of the liquid radiation curable compounds and the amount of water present.

These coating compositions can be set to a solid by a combination of ultraviolet radiation and infra-red radiation. A typical ultraviolet source suitable for this type of curing process is a Hanovia 200 watt medium pressure mercury lamp which emits both ultraviolet and infrared radiation. Polymerization efficiencies of the coating composition are dependent on such parameters as the nature of the radiation curable polar compounds, atmosphere in contact with the coating, quantum efficiency of the radiation absorbed, thickness of coating and inhibitory effects of the various materials in the composition. The water present on the coating composition is evaporated by the energy of the infra-red radiation.

The coating weight of the solid film containing the microcapsules can be from about 0.2 pounds to about 12 pounds per 3300 square feet. The preferred coating weight range is from about 4 to about 7 pounds per 3300 square feet.

The following examples further illustrate but do not limit the invention.

EXAMPLE 1

An aqueous phase (hydrophilic emulsion component) was prepared as follows:

In a 250 ml. beaker with magnetic stirring bar on a magnetic stirring hot plate, 40 grams of distilled water, 60 grams of a radiation curable compound, 2-hydroxyethyl acrylate, 0.5 gram of carboxymethyl cellulose (grade 7L2, Hercules, Inc., Wilmington, Del.) and 0.5 gram of hydroxypropyl cellulose (Klucel L, Hercules, Inc.) were mixed together and then heated to 60° C. until the solid ingredients were dissolved. After cooling the mixture to room temperature, 0.1 gram of Turkey Red Oil (sulfonated castor oil) and 0.5 gram of triethylene tetramine were stirred in.

An oil phase (hydrophobic emulsion component) was prepared as follows:

In an 100 ml. beaker with magnetic stirring bar on a magnetic stirring hot plate, 24 grams of monoisopropylbiphenyl, 0.83 gram of 3-(N,N-diethylamino7-(N,N-dibenzylamino)fluoran, and 0.08 gram of 2,3-(1'-phenyl-3'-methyl)-7-(N,N-diethylamino)-4-spirophthalidochromene were heated with stirring at 90° C. for one hour to dissolve the above color precursors. To this solution at room temperature, 3 grams of an aliphatic polyisocyanate (Desmodur N-100), 3 grams of an aromatic polyisocyanate (NIAX SF-50) and 0.9 gram of a polyol (Quadrol) were added with stirring until homogeneous.

The oil phase in the 100 ml. beaker was added slowly over a one minute period to the first solution in a Waring Blender on low speed, and stirred for five minutes more. A mint green colored mixture resulted in which capsules 1 to 4 microns in diameter were observed through a 450X microscope. The mixture was placed in a 60° C. hot water bath for 30 minutes. An off-white dispersion resulted, with no apparent change in capsule size. 1.5 grams of azobisisobutyronitrile photoinitiator was added, a drawdown was made on 13.5 lb. per 1300 square feet paper rawstock with a No. 16 Mayer rod and exposed to a 200 watt mercury ultraviolet lamp at a distance of 4 inches for one minute. The coating was smooth and tack-free. When pressure imaged against a kaolin/phenolic resin coated CF sheet, a clear, green image was formed on the CF sheet.

EXAMPLE 2

The example above was repeated except that 0.5 gram of polyvinyl alcohol (grade 50-05, E. I. duPont de Nemours & Co., Inc., Wilmington, Del.) was used in place of hydroxypropyl cellulose. Capsules before heat curing were 1 to 4 microns as determined by microscopic examination of the dispersion. The image formed was clear but not as intense as in Example 1.

EXAMPLE 3

An aqueous phase was produced by stirring together 90 grams of a radiation curable compound, N-methylol acrylamide (60% solution in water, from Proctor Chemical Company, Salisbury, N.C. 28144), 0.5 gram of a dispersing agent (Triton N-101—Rohm and Haas Company, Philadelphia, Pennsylvania), 0.8 grams of sodium carbonate (anhydrous) and 9.3 grams of diethylene triamine, An oil solution was prepared by dissolving the following color precursors into 19 grams of MIPB (monoisopropylbiphenyl) with heating to 85° C.: 0.40 gram of crystal violet lactone, 0.10 gram of 3,3-bis(1'-ethyl-2'-methylindol-3-yl) phthalide, 0.17 gram of 2,3-(1'-phenyl-3'-methyl)-7-(N,N-diethylamino)-4-spirophthalidochromene, and 0.05 gram of 3-N,N-diethylamino-7-(N,N-dibenzylamino) fluoran. When the solution was cooled and filtered, 3 grams of terephthaloyl chloride were dissolved. The oil solution was added to the aqueous phase in a Waring Blender operating a high speed over a 30 second period and was stirred for 5 minutes more. Microscopic examination of the fluid, gray mixture showed capsules of 2 to 10 micron size. Few agglomerates were present. A 0.1 gram of benzoin methyl ether photoinitiator was stirred in. The mixture was coated on 13 lb./1300 square feet form bond using a No. 16 Mayer rod and exposed to an ultraviolet lamp as in Example 1. When pressure imaged against kaolin/-phenolic coated CF paper with a ballpoint pen, a purple image was formed.

EXAMPLE 4

An aqueous phase was produced by stirring together 90 grams of a radiation curable compound, N-methylol acrylamide (60% solution in water, from Protor Chemical Company, Salisbury, N.C. 28144), 1.0 gram of a dispersing agent (Triton N-101—Rohm and Haas Company, Philadelphia, Pa.), and 1.59 gram of sodium carbonate (anhydrous).

An oil solution containing color precursors was prepared as in Example 3 and 3 grams of terephthaloyl chloride were dissolved therein. The oil solution was added to the aqueous phase in a Waring Blender operation at high speed over a 30 second period and was stirred for 3 minutes more. To the Waring Blender mixture, 6.19 grams of diethylene triamine was added over a 15 second period and the speed was reduced to low speed for 5 minutes more. Microscopic examination of the fluid, light pink mixture showed capsules of approximately 2 to 10 micron size. Few agglomerates were present. 0.1 gram of benzoin methyl ether photoinitiator was stirred in. The mixture was coated on 13 lb./1300 square feet form bond using a No. 16 Mayer rod and exposed to an ultraviolet lamp as in Example 1. When pressure imaged against kaolin/phenolic coated CF paper with a ballpoint pen, a purple image was formed.

What is claimed is:

1. A process for producing a liquid coating composition for use in the manufacture of pressure-sensitive carbonless transfer papers, said liquid coating composition being characterized by being curable by radiation to a dry, solid, tack-free resin, said radiation being a combination of ultraviolet radiation and infra-red radiation and said liquid coating composition being further characterized by containing microcapsules having a hydrophobic core material, comprising the steps of (a) preparing an emulsion containing droplets of hydrophobic emulsion component dispersed in a hydrophilic emulsion component, said hydrophobic emulsion component comprising a hydrophobic liquid, said hydrophobic emulsion component additionally containing a first wall-forming material capbable of reacting a condensation polymerization with a second wall-forming material to form a polymeric capsule wall, said first wall-forming material being soluble in said hydrophobic emulsion component, said polymeric capsule wall being substantially insoluble in said hydrophilic and said hydrophobic emulsion components, said hydrophilic emulsion component comprising an emulsifier dispersed in a radiation curable hydrophilic liquid, said radiation curable hydrophilic liquid comprising water and at least one radiation curable polar compound, said emulsion additionally containing said second wall-forming material;

(b) subjecting said emulsion, with mixing, to temperature conditions for a period of time sufficient to substantially completely polymerize said first and second wall-forming materials thereby forming a dispersion of microcapsules in said hydrophilic emulsion component, said microcapsules having capsule walls substantially impermeable to said hydrophilic and said hydrophobic emulsion components; and (c) adding a photoinitiator to said dispersion of microcapsules.

2. The process of claim 1 wherein said radiation curable polar compound has at least one terminal ethylenic group per molecule.

3. The process of claim 1 wherein said hydrophobic emulsion component includes a chromogenic material, said chromogenic material being a color precursor of the electron-donor type.

4. The process of claim 1 wherein said first wall-forming material is an oil soluble compound selected from the group consisting of polyisocyanates and polyacid halides.

5. The process of claim 2 wherein said polar compound having said at least one terminal ethylenic group per molecule is selected from the group consisting of N-vinyl-2-pyrrolidone, acrylamide, N-methylolacrylamide, hydroxyethyl acrylate, hydroxypropyl acrylate, diacetone acrylamide, 2-acryl-amido-2-methylpropanesulfonic acid, acrylic acid, polyethylene glycol monoacrylates, polyethyleneglycol polyacrylates, polyvinyl alcohol acrylate, starch acrylate, cellulose acrylate, quaternary ammonium salt derivatives of dimethylaminoethyl acrylate and methacrylate and mixtures thereof.

6. The process of claim 1 wherein said second wall-forming material is selected from the group consisting of polyols, polythiols, polyamines, polycarboxylic acids and mixtures thereof.

7. The process of claim 1 wherein said liquid coating composition contains between about 20% to about 60% by weight of water.

8. A process for producing a liquid coating composition for use in the manufacture of pressure-sensitive carbonless transfer papers, said liquid coating composition being characterized by being curable by radiation to a dry, solid, tack-free resin, said radiation being a combination of ultraviolet radiation and infra-red radiation, said liquid coating composition being further characterized by containing microcapsules having a hydrophobic core material, comprising the steps of:

(a) preparing an emulsion containing droplets of a hydrophobic emulsion component dispersed in a hydrophilic emulsion component, said hydrophobic emulsion component comprising a chromogenic material in a hydrophobic liquid, said chromogenic material being soluble in said hydrophobic liquid, said hydrophobic emulsion component additionally containing a first-wall forming material capable of reacting by condensation polymerization with a second wall-forming material to form a polymeric capsule wall, said first wall-forming material being soluble in said hydrophobic emulsion component, said polymeric capsule wall being substantially insoluble in said hydrophilic and said hydrophobic emulsion components, said hydrophilic emulsion component comprising an emulsifier dispersed in a radiation curable hydrophilic liquid, said radiation curable hydrophilic liquid comprising water and at least one polar compound selected from the group consisting of N-vinyl-2-pyrrolidone, acrylamide, N-methylolacrylamide, hydroxyethyl acrylate, hydroxypropyl acrylate, diacetone acrylamide, 2-acrylamido-2-acrylamido-2-methylpropanesulfonic acid, polyethylene glycol monoacrylates, polyethylene glycol polyacrylate, polyvinyl alcohol acrylate, starch acrylate, cellulose acrylate, quarternary ammonium salt derivatives of dimethylaminoethyl acrylate and methacrylate and mixtures thereof, said emulsion additionally containing said second wall-forming material;

(b) subjecting said emulsion, with stirring, to a temperature of from about 0° C. to about 70° C. for a period of time from about 1 hour to about 16 hours, said temperature and said time being sufficient to substantially completely polymerize said first and second wall-forming materials thereby forming a dispersion of microcapsules in said hydrophilic emulsion component, said microcapsules having capsule walls substantially impermeable to said hydrophilic and said hydrophobic emulsion components; and (c) adding a photoinitiator to said dispersion of microcapsules.

9. A process for producing a pressure-sensitive transfer paper comprising the steps of:

(a) preparing an emulsion containing droplets of a hydrophobic emulsion component dispersed in a hydrophilic emulsion component, said hydrophobic emulsion component comprising a chromogenic material in a hydrophobic liquid, said chromogenic material being soluble in said hydrophobic liquid, said hydrophobic emulsion component additionally containing a first wall-forming material capable of reacting by condensation polymerization with a second wall-forming material to form a polymeric capsule wall, said first wall-forming material being soluble in said hydrophobic emulsion component, said polymeric capsule wall being substantially insoluble in said hydrophilic and said hydrophobic emulsion components, said hydrophilic emulsion component comprising an emulsifier dispersed in a radiation curable hydrophilic liquid, said radiation curable liquid comprising water and at least one radiation curable polar component, said emulsion additionally containing said second wall-forming material;

(b) subjecting said emulsion, with mixing, to temperature conditions for a period of time sufficient to polymerize said first and second wall-forming materials thereby forming a dispersion of microcapsules in said hydrophilic emulsion component, said microcapsules having a hydrophobic core material and capsule walls substantially impermeable to said hydrophilic and said hydrophobic emulsion components;

(c) adding a photoinitiator to said dispersion of microcapsules;

(d) applying said dispersion of said microcapsules to a paper substrate; and (e) setting said dispersion of said microcapsules by subjecting said dispersion on said paper substrate to radiation for a period of time sufficient to cure said radiation curable hydrophilic liquid to a dry, solid, tack-free resinous film on said paper substrate, said radiation being a combination of ultraviolet radiation and infra-red radiation.

10. The process of claim 9 wherein said chromogenic material is a color precursor of the electron-donor type.

11. The process of claim 9 wherein said combination of ultraviolet radiation and infra-red radiation is obtained from a mercury vapor lamp.

12. The process of claim 9 wherein said dry, solid, tack-free film is from about 0.5 pounds to about 12 pounds per 3300 square feet.

13. A pressure-sensitive carbonless transfer paper prepared by the process of claim 11.

* * * * *